United States Patent [19]

Short et al.

[11] Patent Number: 4,540,734
[45] Date of Patent: Sep. 10, 1985

[54] SAG CONTROL OF HIGH SOLID POLYURETHANE CLEARCOATS BY UREA THIXOTROPE/ACRYLIC MICROGEL SYSTEMS

[75] Inventors: William T. Short, Southfield; Robert A. Ottaviani, Washington; Donald J. Hart, Sterling Heights, all of Mich.

[73] Assignee: General Motors Corporation, Detroit, Mich.

[21] Appl. No.: 635,555

[22] Filed: Jul. 30, 1984

[51] Int. Cl.³ .............................................. C08L 75/00
[52] U.S. Cl. .................................................... 524/507
[58] Field of Search ................................. 524/507, 100

[56] References Cited

U.S. PATENT DOCUMENTS

| | | | |
|---|---|---|---|
| 3,652,490 | 3/1972 | Gager | 524/507 |
| 3,893,956 | 7/1975 | Brandt | 260/858 |
| 4,017,456 | 4/1977 | Tucker et al. | 524/507 |
| 4,122,055 | 10/1978 | Tugukuni et al. | 524/507 |
| 4,180,489 | 12/1979 | Andrew et al. | 525/78 |
| 4,180,619 | 12/1979 | Makhlouf et al. | 526/201 |
| 4,311,622 | 1/1982 | Buter | 525/28 |
| 4,314,933 | 2/1982 | Berner | 524/100 |
| 4,383,068 | 5/1983 | Brandt | 524/196 |
| 4,387,194 | 6/1983 | Ottaviani et al. | 525/454 |
| 4,452,834 | 6/1984 | Nachtkamp et al. | 524/507 |

Primary Examiner—Joseph L. Schofer
Assistant Examiner—N. Sarofim
Attorney, Agent, or Firm—Randy W. Tung

[57] ABSTRACT

Novel, high solids urethane clearcoat compositions having improved flow characteristics by the incorporation of a flow control system composed of urea thixotrope/acrylic microgel additives. The urea thixotrope constituent is prepared by reacting a polyether polyol with a stoichiometric excess of a saturated cyclic aliphatic polyisocyanate to produce isocyanate-terminated prepolymers. These prepolymers are then modified by reaction with an ethanolamine to form urea end-capped thixotropes which are compatible in structure with any urethane clearcoat system. A combination of one of these urea thixotropes and a polymethyl methacrylate microgel of fine particle size is used effectively to reduce sagging of high solids urethane clearcoat systems. In fact, the combination of the two components produces a synergistic effect which is greater than that expected from any one of the components in the flow control system.

3 Claims, 6 Drawing Figures

SAG CONTROL OF HIGH SOLID POLYURETHANE CLEARCOATS BY UREA THIXOTROPE/ACRYLIC MICROGEL SYSTEMS

BACKGROUND OF THE INVENTION

This invention relates to high solids urethane clearcoat compositions, the flow characteristics of which are modified by the incorporation of a flow control system composed of urea thixotrope/acrylic microgel additives.

Earlier work by two of the inventors hereof led to the development of novel, ultraviolet (U.V.) stable compositions which are the subject matter of U.S. Pat. No. 4,387,194, assigned to General Motors Corporation, issued June 7, 1983. One such composition that was used in the current invention is a blend of polypropylene oxide polyethers and a hydroxy-terminated polyurethane derived from the polyethers, a U.V. stabilizing group that is incorporated into the polyurethane polymer backbone, and a melamine-formaldehyde crosslinking agent. These resins are generally the bases of high solids coating compositions forming durable, high gloss finishes useful in painting automobile bodies.

For high solids coatings, the control of their flow behavior, i.e., the competing processes of sagging and leveling, is probably the most important and the most difficult aspect of their formulation. The problem is particularly acute when the paint is to be sprayed onto a vertically oriented surface. Coatings must be able to level in order to minimize surface irregularities or waviness and to develop the necessary appearance properties required of an automotive finish. During this time, various degrees of sagging will occur. Since those factors that govern sagging and leveling necessarily oppose each other, designing a system with complete leveling will result in severe sagging, whereas complete sag control results in no leveling. Consequently, a compromise must be made by balancing those factors that affect sagging and leveling. Our invention provides a method of controlling the flow behavior of a high solids urethane clearcoat by the addition of a combination of a urethane-urea thixotrope/acrylic microgel flow control system.

When working with conventional low solids coatings, a paint-formulator relies almost exclusively on the careful blending of organic solvents to control the rate of solvent evaporation which, in turn, controls the coating's viscosity and rheological behavior from application through the final film formation or cure. These coatings can lose as much as 50 to 70% of their solvent content during the application and flash periods. High solids coatings, however, lose very little solvent during application and flash. Consequently, viscosity increase via solvent loss is negligible and is not a viable means of obtaining flow control.

High solids clearcoats are generally easy to apply to substrates by the spraying technique even though the nonvolatile solids (resin) content of such systems may be well above 50%. However, their viscosities and thixotropic properties are such that after application, they are prone to run and sag when applied to vertically oriented substrates. Improved flow control of these paint compositions is therefore critical to their greater utility in automotive applications where coatings may be sprayed onto vertically oriented body panels or parts with complex surface contours.

Desired rheological behavior for a sprayed paint coating dictates that it has a very low viscosity when subjected to high shear in the paint spraying process. However, once the paint has been applied to a substrate, the viscosity should increase enough so that the paint does not sag or drip but not so much that it fails to level.

Some flow control agents such as N,N-diethanolurea-terminated polyurethane have been used successfully to control sagging in high solids pigmented urethane paint. This practice is disclosed in a copending application U.S. Ser. No. 633,025, filed July 20, 1984 in the name of William T. Short et al and assigned to the assignee of this invention. For instance, in urethane paint containing titanium dioxide pigment, the addition of a single thixotropic flow control agent dramatically improves the flow characteristics by reducing sag to as little as 12% of the control coating which contained no thixotrope additives. However, when the same thixotropic flow control agent is used in high solid polyurethane clearcoats containing no pigment, the effect of the thixotrope on sagging is only marginal.

Accordingly, it is an object of this invention to provide a flow control system (i.e., where two chemical constituents act in concert) which, when added to high solids polyurethane clearcoat, improves the flow characteristics of such clearcoats, particularly to promote ease of spraying and adequate leveling while inhibiting sagging and dripping.

It is another object of this invention to provide a high solids, non-pigmented urethane clearcoat formulation containing a flow control system such that the clearcoat is sprayable in a production environment, curable in a relatively short period of time at relatively low temperatures, and spreadable when wet without sagging or dripping.

BRIEF SUMMARY OF THE INVENTION

In accordance with a preferred embodiment of this invention, a combination of a polymeric urethane-urea thixotrope and a transparent acrylic microgel is used effectively to control the flow of a high solids urethane clearcoat system. In fact, the combination of the two components produces synergistic effect which is greater than that expected from any one of the components.

The synthesis of the polymeric urethane-urea thixotrope constituent can be accomplished in a two-step process. First, an isocyanate-terminated urethane prepolymer is prepared by reacting a polyether polyol with a stoichiometric excess of a saturated cyclic aliphatic polyisocyanate. The polyether polyol used is preferably a mixture of polyoxypropylene oxide diols and triols in a ratio of diol:triol of about 1:1. Saturated cyclic aliphatic polyisocyanate is preferred for its ultraviolet stability. A preferred polyisocyanate for the subject invention is methylene bis(4-cyclohexyl isocyanate).

In the second step of the synthesis, these isocyanate-terminated prepolymers are modified by reaction with an ethanolamine. The amine groups of the ethanolamine react with the isocyanate to form urea linkages while the hydroxy groups of the ethanol become terminal functional groups.

The second constituent of our flow control system is an acrylic microgel which is a 50 wt% dispersion of a lightly cross-linked polymethyl methacrylate in a hydrocarbon solvent. This acrylic microgel is prepared by emulsion polymerization of a high functional monomer such as methyl methacrylate with a small amount of alkylene glycol dimethacrylate as the cross-linking agent. Any compatible solvent, such as cyclo-hexane or hexane may be used in the microgel as the dispersion medium. The cross-linking density of the microgel is estimated at between 10 to 20%. The particle sizes of the microgel fall in between 1 to 50 microns. Other polymeric microgels such as that of polystyrene, polyethylene, and polybutadiene may also be used as tie points in the flow control system.

The ratio of thixotrope to microgel in the flow control system is normally 1:1, however, any ratio in the range of 1:5 to 5:1 is possible. The total amount of the flow control system added to the urethane clearcoat system is 10 wt%, within a possible range of from 2 to 20 wt%. After the two constituents are physically blended with a urethane binder system containing a cross-linking agent and an accelerator in a high speed blender, the modified urethane clearcoat can be applied to panels by conventional spraying equipment.

The pronounced flow control effect of our system is believed to be due to the interaction between the polar and hydrogen bond groups on the urethane-urea thixotropes with the particles of the transparent polymethyl methacrylate. When the flow control system is added to a urethane clearcoat, the acrylic microgel particles act like tie molecules by providing sites for attachment by secondary bonding associations of the clearcoat system. It is believed that this secondary bonding association is formed between the resin molecules, the thixotrope molecules, and the acrylic microgel particles before the paint is cured. However, this secondary bonding is upset by the application of stress in the paint spraying process so that the viscosity under spray conditions is reduced exhibiting a shear-thinning behavior. However, once the uncured resin is applied to a substrate, secondary bonding reoccurs which helps to prevent sagging and dripping yet permitting enough flow to have good leveling properties. It is hypothesized that the primary source of this secondary bonding in the uncured resin is the interaction between the urea end groups and the particles of the transparent acrylic microgel.

Accordingly, the subject invention of a synergistic combination of urethane-urea thixotrope/acrylic microgel can be effectively used as a flow control system in high solids urethane clearcoats. Secondary bonding associations between the polar urea linkages in the urethane-urea thixotrope molecules and the filler particles prevent sagging and dripping before the clearcoats are cured. The inclusion of this urethane-urea thixotrope/acrylic microgel flow control system in the uncured clearcoat does not interfere with any other desirable properties of the urethane clearcoat such as spraying, leveling, and gloss.

DETAILED DESCRIPTION

The objects and advantages of our invention will be better understood in view of the detailed description which follows. Reference will be made to the figures in which.

It is well known that saturated cyclic aliphatic polyisocyanates are more stable to ultraviolet radiation than unsaturated cyclic, straight chain or branched isocyanates. Therefore, the preferred polyisocyanates for the subject invention include such compositions as methylene-bis(4-cyclohexyl isocyanate), isophorone diisocyanate, hexamethylene diisocyanate, and 1,4-cyclohexane bis(methyl isocyanate). The first-mentioned compound is a preferred diisocyanate for the subject invention. It is a liquid sterioisometric mixture originally sold under the trade name of "Hylene W" by Dupont that is available as of the filing date hereof as Desmador-W ®, sold by Mobay. The material is sometimes generically referred to as $H_{12}MDI$. Analysis showed the material as received to be greater than about 99.2% pure. The isocyanate constituent should have a functionality of at least about 2 to promote a chemically cross-linked paint product.

The flexibilizing constituents of the subject urethane paints are preferably polyether polyols. These polyols have been found to provide urethane paints with such properties as high gloss, distinctness of image, impact resistance and chip resistance. The preferred polyethers are blends of polyoxypropylene diols and triols. Other polyether polyols such as those based on polyethylene oxide may also be used if they have suitable U.V. stability and workable viscosities. Table I lists a number of polyethers that were used.

TABLE I

SELECTED POLYPROPYLENE OXIDE POLYETHERS

| Material[a] | Functionality | % Solids | Viscosity @ 25° C. (Centipoise) | Hydroxyl Number | Molecular Weight |
|---|---|---|---|---|---|
| P-410 | 2 | 100 | 75 | 265 | 424 |
| P-1010 | 2 | 100 | 150 | 105 | 1050 |
| TP-440 | 3 | 100 | 600 | 398 | 423 |
| TP-1540 | 3 | 100 | 350 | 110 | 1530 |

[a]All polypropylene oxide polyethers were obtained from BASF Wyandotte under the trade name Pluracol ® resins.

Alkylolated amino resins are known cross-linking agents for industrial coatings. Outstanding properties such as hardness, high gloss, clarity and durability are provided by melamine curatives. Thus, melamine cross-linking agents are preferred for these U.V. stabilized urethane coatings. We have found partially methylolated melamine resins to be suitable. These are commercially available and may be formed by reacting less than six moles of formaldehyde with one mole of melamine in a methanol solution. The reaction yields a methylolated melamine by the addition of hydroxy methyl groups to the amine groups of the melamine resin. A preferred curing agent for this invention is trimethylol melamine dissolved in butanol that is sold by American Cyanamid under the trade designation Cymel ® 325. Generally, the melamine curing agent should be present in amounts adequate to react with substantially all of the free hydroxyl groups of a urethane binder resin to be cross-linked. About 40 grams of trimethylol melamine were used per equivalent of free hydroxy to cure the subject urethane binder resins.

In order to cure the subject paint resins in reasonable times at relatively low temperatures, it is necessary to catalyze, i.e., accelerate, the melamine cross-linking reaction. The preferred catalysts are weak acids soluble in organic solvents. A preferred catalyst is dimethyl pyrophosphoric acid (DMPA) sold by American Cyanamid as Cycat ® 296.9.

About 2 to 5 weight percent DMPA (excluding solvent weight) was used based on the weight of trimethylol melamine, about 3% being preferred.

Compatible solvents such as cellusolve acetate, methyl ethyl ketone (MEK), butyl alcohol, etc., are incorporated consistent with normal paint practices. Likewise, fillers and other paint additives may be incorporated so long as they do not interfere with the invention. Table II shows a typical composition for a polyether-polyurethane clearcoat and a microgel clearcoat used in this invention.

TABLE II
FORMULATION OF THE URETHANE-MELAMINE ENAMELS

|  | Clear Coat | Microgel Clear Coat |
| --- | --- | --- |
| Urethane Resin Solids (g) | 50.0 | 50.0 |
| Melamine Resin Solids (g) | 50.0 | 50.0 |
| Pigments (g) | 0.0 | 5.0, Microgel |
| Acetone (g) | 4.4 | 4.4 |
| i-Butanol (g) | 12.5 | 12.5 |
| Methyl propyl ketone (g) | 13.0 | 13.9 |
| Methanol (g) | 26.0 | 27.7 |
| Methyl cellosolve ® (g) | 6.5 | 6.9 |
| Butyl cellosolve ® (g) | 6.5 | 6.9 |
| Nonvolatiles (wt %) | 60 | 60 |
| Zahn 2 Viscosity (Seconds) | 30.8–34.3 | 34.2–37.3 |

A key feature of this invention is the incorporation of small amounts of a synergistic combination of a specially formulated urethane-urea polymer and a transparent filler of acrylic microgel in high solid urethane clearcoats to control their flow behavior. The effect of synergism can be explained as follows. Assuming that a urethane clearcoat containing no flow control additives (the control) produces a sag length of 30 mm at a certain film thickness and that the addition of 5 wt% additive A alone reduces the sag length to 20 mm (i.e., ⅔ of the original sag of 30 mm), while the addition of 5 wt% of additive B alone reduces the sag length to 10 mm (i.e., ⅓ of the original sag of 30 mm) and further that there is no interaction between additive A and additive B, i.e., there is no synergistic effect, then the addition of both 5 wt% additive A and 5 wt% additive B should produce a reduction in sag length to approximately 7 mm (calculated by 30 mm × ⅔ × ⅓). Therefore, an observation of sag length under 7 mm when the same amounts of additives A and B were added would indicate a synergism effect or an interaction between the additives A and B.

The flow control system of urethane-urea thixotrope/acrylic microgel utilized in this invention is specifically designed for compatibility with urethane clearcoats. The system is believed to function by increasing viscosity and promoting secondary bonding associations prior to and during the clearcoat curing process. The theory supporting the flow control process provided in accordance with this invention is as follows. It is generally known that the viscosity behavior of coatings under high shear rate conditions such as spraying through a small orifice under pressure are dominated by the properties of the binder resins, fillers and solvents. Under the ultra low shear rate conditions following deposition and before cure, the flow properties are dominated by solvent evaporation and the formation of weak, easily disrupted secondary bonding associations. This secondary bonding association effect is particularly significant in high solids coatings which contain low levels of solvents. It is believed that in our clearcoats the polar urea linkages on the urethane-urea thixotrope contained in the flow control system are particularly adapted to form secondary bonding associations with the filler particles. It is hypothesized that these polar urea linkages also form secondary bonding associations with the melamine curing agent but to a lesser extent.

The constituent that is reacted with a portion of the isocyanate resin precursor to form these urea linkages is an amine which is mono-, di- or tri-substituted with hydroxy-terminated alkane groups were the maximum alkane chain length is less than about ten carbon atoms. The preferred reactant is diethanolamine, although ethanolamine and triethanolamine are also useful.

EXPERIMENTAL BACKGROUND

Unless otherwise stated, reagent grade chemicals were used as received. Acetone and 2-pentanone were dried over Linde ® 3A molecular sieves before use as solvents for free isocyanate. Methylene-bis-(4-cyclohexyl isocyanate) sold by Dupont under the trade name Hylene ® W was filtered through glass frit to remove any urea or polymeric contaminants formed upon storage.

Ethanolamine, diethanolamine and triethanolamine were obtained from Aldrich Chemical Co. Puracol ® polyoxypropylene glycols were obtained from BASF Wyandotte, Inc., and the Cymel ® 325 melamine-formaldehyde resin was obtained from the Cyanamid Co.

The synthesis and composition of the base urethane-melamine clearcoats whose flow characteristics are improved in accordance with this invention are fully set out in U.S. Pat. No. 4,387,194 which is hereby incorporated by reference.

A standard procedure was followed for the synthesis of all urea-terminated urethane thixotropes. First, an isocyanate-terminated urethane resin was prepared by the reaction of a mixture of polyoxypropylene diols and triols (BASF Pluracol ® resins) with an excess of methylene-bis-(4-cyclohexyl isocyanate). These resins are further modified by reaction with variously substituted ethanolamines to introduce strongly hydrogen bonding, terminal urethane and urea groups.

This two-step procedure permitted independent control of the structural characteristics of the urethane backbone such as branching, molecular weight, unreacted monomer content, etc., as well as the nature of terminal functional groups. The same procedure was also used to investigate the effect of urethane structure on the effectiveness of the flow control systems. A series of eight isocyanate-terminated urethanes was synthesized (table III) and end-capped with N,N-diethanolamine. Aside from the molecular weight, the two most important variables were the branching coefficient and the residual diisocyanate content. Those resins with a branching coefficient of 0.22 were almost linear while those with the higher value of 0.80 were highly branched. The free diisocyanate content was important because it controlled the amount of monomeric diurea formed when the resins were capped with N,N-diethanolamine.

and polybutadiene may also be used in the flow control system. Any compatible solvent, such as cyclo-hexane or hexane can be used in the microgel as the dispersion medium. The cross-linking density of the acrylic microgel is estimated at between 10 to 20%.

EXAMPLE

Synthesis of a Typical Urea-Capped Polyurethane Thixotrope (Resin 304)

A mixture of 17.1 g (33.5 meq) Pluracol® P1010 diol, 18.4 g (129 meq) Pluracol® TP440 triol, 64.8 g (494.7 meq) Hylene® W diisocyanate, and 50 g dry acetone were mixed together in an 8-oz bottle. Next, 1 drop (0.02 g) dibutyltin dilaurate catalyst was added, the sample was capped and shaken again briefly, then

TABLE III

STRUCTURAL CHARACTERIZATION OF POLYURETHANE COATING BINDERS AND FLOW CONTROL RESINS

| Resin No. | DP(N) Chains | Initial NCO:OH | Branching Coefficient | Equivalent Weight of | | | $MN^a$ ALL | $MN^b$ Chains | Wt % Residual Diisocyanate |
|---|---|---|---|---|---|---|---|---|---|
| | | | | Diol | Triol | Diisocyanate | | | |
| B-2$^c$ | 7 | .50 | .50 | 212 | 142 | 131 | 1450 | 2540 | — |
| P301$^d$ | 10 | 2.00 | .80 | 525 | 520 | 131 | 2135 | 5484 | 8.4 |
| P302$^d$ | 6 | 2.00 | .22 | 525 | 520 | 131 | 1692 | 3049 | 8.4 |
| P303$^d$ | 10 | 1.43 | .22 | 525 | 142 | 131 | 3545 | 5252 | 2.7 |
| P304$^d$ | 6 | 3.00 | .80 | 525 | 142 | 131 | 698 | 1949 | 28.9 |
| P305$^d$ | 10 | 1.43 | .22 | 212 | 520 | 131 | 2638 | 3908 | 3.6 |
| P306$^d$ | 6 | 3.00 | .80 | 212 | 520 | 131 | 970 | 2708 | 20.8 |
| P307$^d$ | 10 | 2.00 | .80 | 212 | 142 | 131 | 1140 | 2927 | 15.7 |
| P308$^d$ | 6 | 2.00 | .22 | 212 | 142 | 131 | 988 | 1780 | 14.3 |

$^a$Calculated number average molecular weight of all polymer species.
$^b$Calculated number average molecular weight excluding monomer.
$^c$Hydroxyl-terminated binder resins.
$^d$Isocyanate-terminated thixotrope precursors.

At this point in the synthesis, the resins were treated in either of two ways. In one case, they were simply concentrated on a rotary evaporator until they had been reduced to a nonvolatile content of about 80 wt%. This produced viscous, white, waxy, and somewhat imhomogeneous samples. In the other case, the insoluble portion of the mixture was first removed by precipitation in acetone. When the acetone soluble fraction was concentrated, homogeneous resins with a clear to slightly amber color were obtained. The infrared spectrum of the acetone soluble resins had strong absorbances at 3300, 1727, 1635, and 1110 cm$^{-1}$ arising from the presence of hydroxyl, urethane, urea, and polyether groups. The acetone insoluble fraction also exhibited strong urea and hydroxyl peaks, but both the urethane (1725 cm$^{-1}$) and polyether (1110 cm$^{-1}$) absorbances were absent. Thus, the precipitate was virtually pure diisocyanate that had been end-capped with N,N-diethanolamine. This was also confirmed both by GPC analysis and by direct synthesis.

The acrylic microgel is a 50 wt% dispersion of lightly cross-linked polymethyl methacrylate in a hydrocarbon solvent, obtained from Inmont Corporation. The particle sizes of the microgel fall in between 1 to 50 microns. This acrylic microgel is usually prepared by emulsion polymerization of a high functional monomer such as methyl methacrylate with a small amount of alkylene glycol dimethacrylate as the cross-linking agent. Other organic fillers of polymer emulsion such as polystyrene microgel prepared from emulsion polymerization of 1,4-divinyl-benzene or the microgels of polyethylene allowed to stand overnight.

A portion of the isocyanate-terminated resin so formed was added dropwise to a stoichiometric amount of N,N-diethanolamine. After standing for about 1 hours, this sample was concentrated on a rotary evaporator to give a white waxy solid with a nonvolatile content of 79 wt%.

The rest of the isocyanate-terminated resin was similarly added to a stoichiometric amount of the N,N-diethanolamine. In this case, however, the amine was diluted in a much greater volume of acetone, and the insoluble portion was removed by filtration. When the filtrate was concentrated on a rotary evaporator, a homogeneous, clear, viscous resin was obtained with a solids content of 73 wt%. The chief difference between the two resins was in the greatly reduced monomer content of the filtered sample.

Application of the Coatings and Evaluation of Sagging

All coatings were spray applied with an air atomizing siphon feed gun. The thixotropes were evaluated at 5 wt% concentration based on the binder solids. Two types of coatings were evaluated, clear coats containing no pigmentation (Table IV), and clear coats containing 5 wt% of a proprietary acrylic filler or "microgel" (Table V). In addition, some tests were run using both the unfiltered thixotropes (Series 300) and the filtered resins (Series 300A) from which most of the monomeric species had been removed.

TABLE IV

EFFECT OF URETHANE STRUCTURE OF DIETHANOLUREA-TERMINATED THIXOTROPES ON APPLICATION AND COATING PROPERTIES OF CLEAR COATS WHICH CONTAIN NO ACRYLIC MICROGEL

| Series No. | Thixotrope[a] No. | (Wt %) | P:B[b] | Viscosity[c] (Z-2 Sec) | Thickness (Microns) | Ave. (mm) | Sag (%) | Corrected Sag (mm) | (%) |
|---|---|---|---|---|---|---|---|---|---|
| 7[d] | None | — | 0 | 30.8 | 57 | 38 | 100 | 38 | 100 |
| 7 | None | — | 0 | 30.8 | 39 | 10 | 100 | — | — |
| 7 | 301 | 5 | 0 | 36.0 | 55 | 17 | 60 | 14 | 42 |
| 7 | 301 | 5 | 0 | 36.0 | 34 | 5 | 50 | — | — |
| 7 | 302 | 5 | 0 | 35.2 | 53 | 28 | 75 | 27 | 82 |
| 7 | 302 | 5 | 0 | 35.2 | 34 | 6 | 60 | — | — |
| 7 | 303 | 5 | 0 | 37.1 | 51 | 15 | 53 | 15 | 45 |
| 7 | 303 | 5 | 0 | 37.1 | 33 | 4 | 40 | — | — |
| 7 | 304 | 5 | 0 | 30.3 | 60 | 44 | 100 | 36 | 109 |
| 7 | 304 | 5 | 0 | 30.3 | 36 | 5 | 50 | — | — |
| 7 | 305 | 5 | 0 | 30.7 | 54 | 34 | 63 | 22 | 67 |
| 7 | 305 | 5 | 0 | 30.7 | 33 | 5 | 50 | — | — |
| 7 | 306 | 5 | 0 | 29.4 | 58 | 36 | 95 | 30 | 91 |
| 7 | 306 | 5 | 0 | 29.4 | 35 | 8 | 80 | — | — |
| 7 | 307 | 5 | 0 | 31.0 | 56 | 33 | 87 | 29 | 88 |
| 7 | 307 | 5 | 0 | 31.0 | 33 | 6 | 100 | — | — |
| 7 | 308 | 5 | 0 | 31.6 | 56 | 38 | 50 | 34 | 103 |
| 7 | 308 | 5 | 0 | 31.6 | 35 | 5 | 80 | — | — |
| 8[e] | None | — | 0 | 34.3 | 57 | 28 | 100 | 23 | 100 |
| 8 | 301A | 5 | 0 | 41.6 | 51 | 14 | 50 | 15 | 65 |
| 8 | 302A | 5 | 0 | 37.1 | 50 | 15 | 54 | 17 | 74 |
| 8 | 303A | 5 | 0 | 33.1 | 51 | 16 | 57 | 17 | 74 |
| 8 | 304A | 5 | 0 | 29.3 | 52 | 20 | 71 | 20 | 87 |
| 8 | 305A | 5 | 0 | 30.4 | 50 | 17 | 61 | 19 | 83 |
| 8 | 306A | 5 | 0 | 30.5 | 51 | 14 | 50 | 15 | 65 |
| 8 | 307A | 5 | 0 | 32.3 | 51 | 13 | 46 | 14 | 61 |
| 8 | 308A | 5 | 0 | 33.7 | 51 | 18 | 64 | 19 | 83 |

[a]Based on resin solids.
[b]Grams of pigment/100 grams of resin solids.
[c]At 60 wt % solids, reduced with 4:2:1:1 2-pentanone:methanol:methyl cellosolve:butyl cellosolve.
[d]Monomeric thixotrope species included.
[e]Monomeric thixotrope species removed.

TABLE V

EFFECT OF URETHANE STRUCTURE OF DIETHANOLUREA-TERMINATED THIXOTROPES ON APPLICATION AND COATING PROPERTIES OF CLEAR COATS CONTAINING 5 WEIGHT PERCENT ACRYLIC MICROGEL

| Series No. | Thixotrope[a] No. | (Wt %) | P:B[b] | Viscosity[c] (Z-2 Sec) | Thickness (Microns) | Ave. (mm) | Sag (%) | Corrected Sag (mm) | (%) |
|---|---|---|---|---|---|---|---|---|---|
| 9[d] | None | — | 5 | 34.2 | 62 | 23 | 100 | 16 | 100 |
| 9 | 301 | 5 | 5 | 39.0 | 58 | 7 | 30 | 3 | 22 |
| 9 | 302 | 5 | 5 | 42.0 | 57 | 7 | 30 | 4 | 26 |
| 9 | 303 | 5 | 5 | 43.6 | 54 | 3 | 13 | 2 | 12 |
| 9 | 304 | 5 | 5 | 34.0 | 61 | 18 | 78 | 13 | 82 |
| 9 | 305 | 5 | 5 | 34.4 | 58 | 8 | 35 | 4 | 28 |
| 9 | 306 | 5 | 5 | 31.1 | 60 | 18 | 78 | 13 | 85 |
| 9 | 307 | 5 | 5 | 34.8 | 57 | 10 | 44 | 7 | 45 |
| 9 | 308 | 5 | 5 | 33.3 | 56 | 10 | 44 | 8 | 49 |

[a]Based on resin solids.
[b]Grams of pigment/100 grams of resin solids.
[c]At 60 wt % solids, reduced with 4:2:1:1 2-pentanone:methanol:methyl cellosolve:butyl cellosolve.
[d]Monomeric thixotrope species included.

Figure 1:
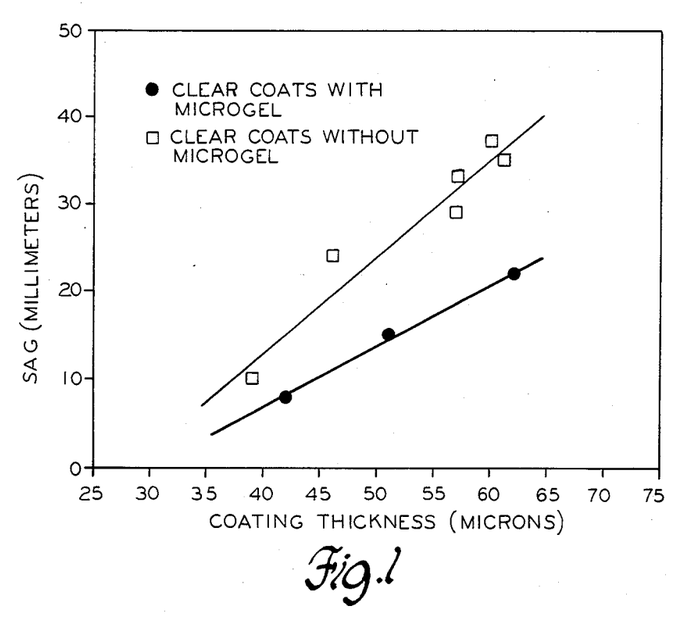
FIG. 1 is a graph showing the effect of coating thickness on the sag of unpigmented clearcoats and clearcoats containing 5 wt% acrylic microgel.

Sagging was quantified by measuring the distance to the upper flow front from the top of a panel. To eliminate some of the vagrancies of the spray process, an unmodified coating was always sprayed as a control, and all values for the gloss, viscosity, and sag were reported relative to the control values. Because the addition of the thixotropes themselves affected the film coating thickness, however, the absolute sag values were also corrected for a nominal film thickness of 52 microns. To do this, coatings of each pigmentation type were prepared without thixotropes. From a plot of sag versus thickness (FIG. 1), it was possible to calculate the incremental change in sag (mm/micron of coating). The values obtained were 1.09 for clearcoats and 0.60 for clearcoats containing microgel. These corrections are not strictly valid for coatings containing thixotropes. Since the variation in film builds was only about 10%, however, the approximate correction is quite acceptable.

RESULTS AND DISCUSSION

Experiments were initiated to determine whether changes in the structure of N,N-diethanolurea-terminated urethane resins could improve their effectiveness as flow control agents in clearcoats. To this end, a series of eight isocyanate-terminated resins were prepared (Table III) and end-capped with diethanolamine. The primary variables were the molecular weights of the polyether diol and triol precursors, the expected degree of polymerization of the resulting urethane resin (excluding monomer), and the amount of branching. One additional factor, the residual monomer diisocyanate content, was also important since it determined the amount of nonpolymeric diurea that formed as a coproduct during the capping reaction.

The effectiveness of a thixotrope was found to be influenced by its urethane structure. In general, increasing the molecular weight improves flow control. Surprisingly, decreasing the amount of branching in the urethane backbone can also make a large improvement in flow control, even though, for a given molecular weight, it decreases the number of diethanolurea groups in the molecule. Apparently, the increased end-to-end distance of the more linear resins more than makes up for this deficiency by improving the ability of the thixotrope to form extended entangled network structures.

Figure 2:
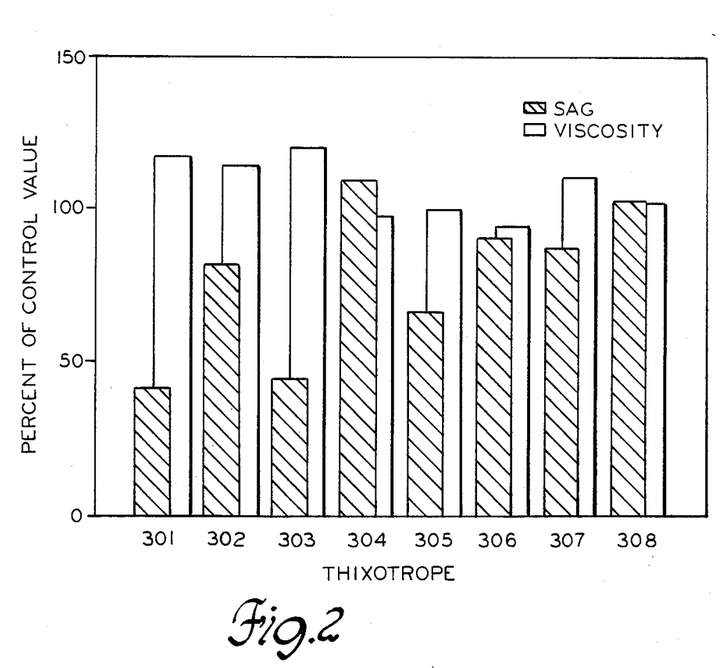
FIG. 2 shows the effect of 5 wt% thixotrope on the properties of unpigmented urethane-melamine clearcoats (Series 7). Control viscosity and sag were 30.8 Zahn 2 seconds and 33 mm.
Figure 3:
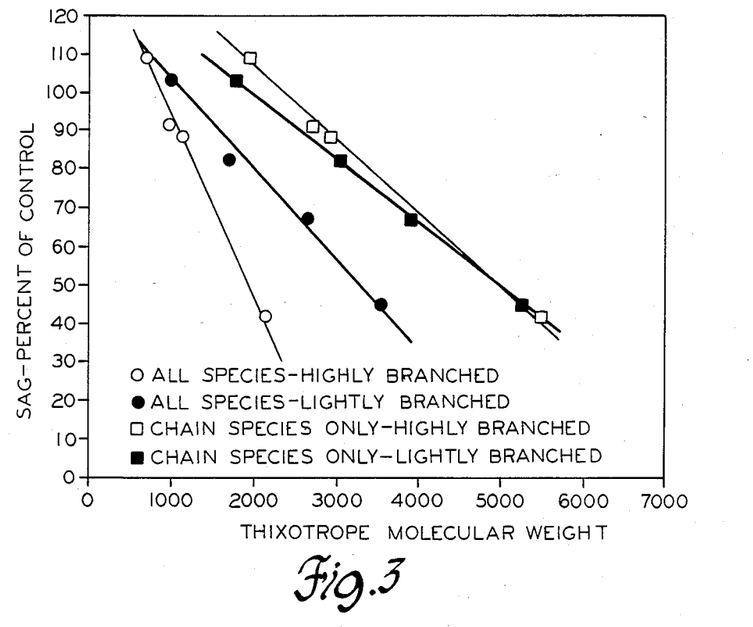
FIG. 3 is a graph showing the effect of thixotrope molecular weight on sag of clear melamine-urethane enamels (Series 7) containing 5 wt% N,N-diethanolurea thixotropes.
Figure 4:
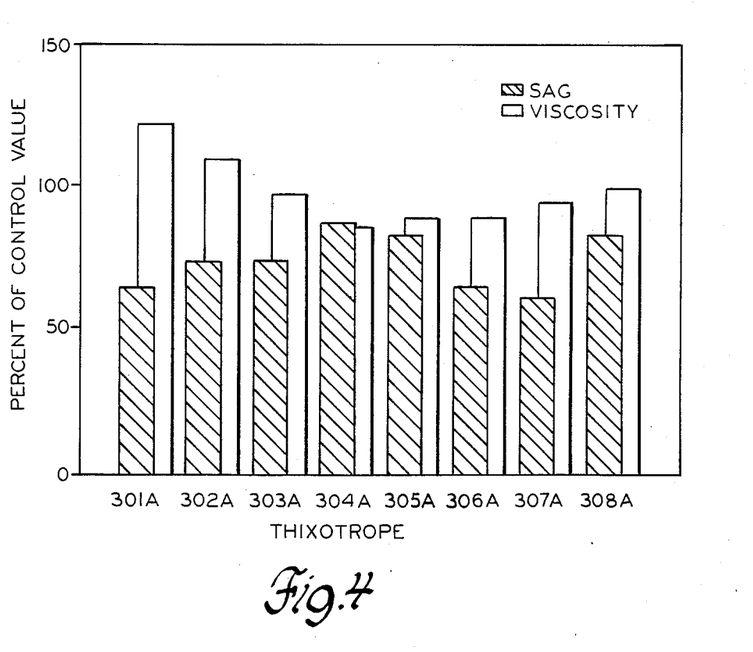
FIG. 4 shows the effect of 5 wt% thixotrope from which monomer was removed on the properties of urethane-melamine clearcoats (Series 8). Control viscosity and sag were 34.4 Zahn 2 seconds and 23 mm.

When these resins were used with unpigmented clearcoats (Table IV, Series 7), similar results were obtained (FIG. 2). The 20° gloss values (unplotted) were all above 90. Since all clearcoats (Series 7–9) had 20° gloss values above 90, close to the upper limit of meaningful 20° gloss reading on the Hunter Lab gloss meter, the values were not included in the figures. The viscosities were virtually the same as the control coating (30.8 Zahn 2 seconds). There was a definite dependence on thixotrope molecular weight and branching with these coatings (FIG. 3) but the greatest reduction in clearcoats was only 42%. Surprisingly, when the monomeric species were removed from the thixotrope resins (Table IV, Series 8), only a very minor reduction of sag (65–87% of the control coating) was observed (FIG. 4), and the structural effects of the urethane thixotrope could not be discerned.

The loss of sag control and structural specificity in the clearcoats indicated that the thixotrope resins did not interact significantly either with the coating binders or with themselves. In the presence of a heterogeneous material, which can serve as a complexing or tie point, however, the N,N-diethanolurea urethanes act as effective flow control agents. This role is filled by the pigment in the white enamels and, to a lesser extent, even the insoluble diurea molecules in the clearcoats.

Figure 5:
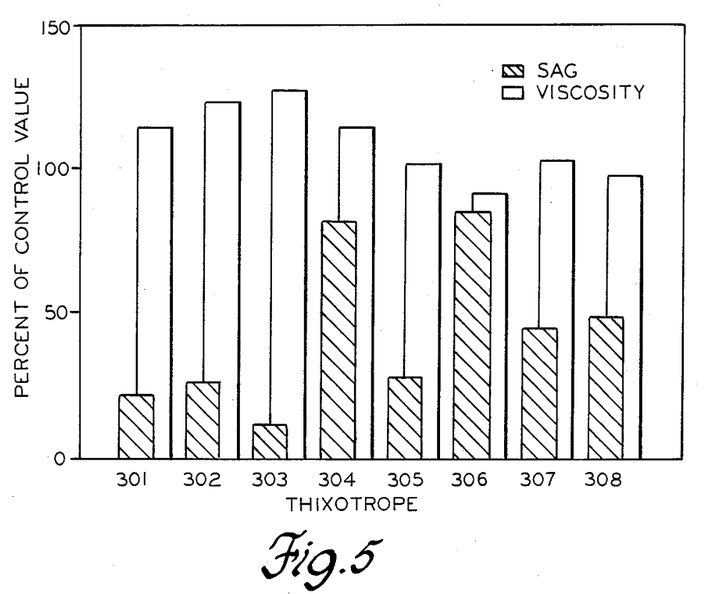
FIG. 5 shows the effect of 5 wt% thixotrope on the properties of urethane-melamine clearcoats containing 5 wt% acrylic microgel (Series 9). Control viscosity and sag were 34.2 Zahn 2 seconds and 16 mm.
Figure 6:
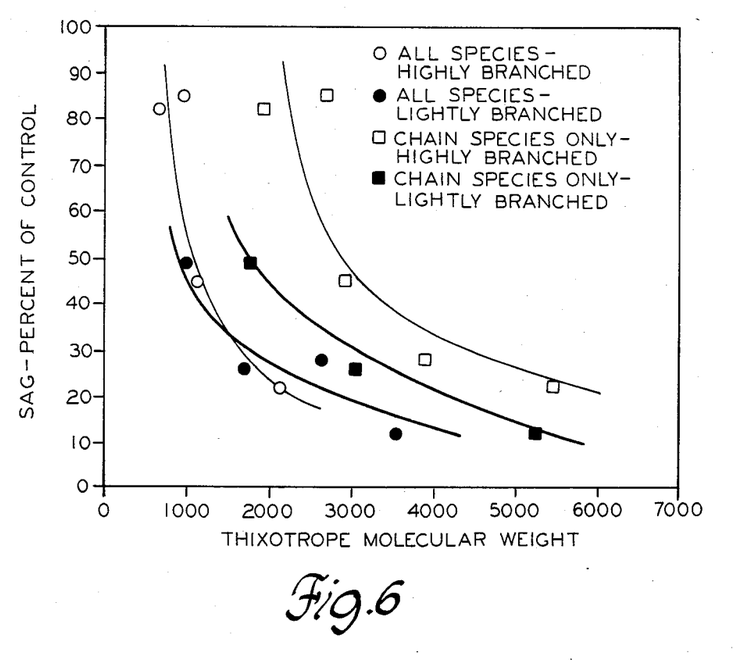
FIG. 6 is a graph showing the effect of thixotrope molecular weight on sag of clear melamine-urethane enamels containing 5 wt% acrylic microgel (Series 9) and 5 wt% N,N-diethanolurea thixotropes.

Therefore, it seemed reasonable that effective control of sag in clearcoats could be achieved if the thixotropes were used in conjunction with a transparent pigment or filler. A series of clear coatings containing 5 wt% (based on solids content) of a commercial acrylic microgel additive was prepared using each of the eight thixotropes (Table V, Series 9). The microgel was itself a moderately effective flow control agent in this system, the control coating exhibiting 16 mm sag, compared to 33 mm sag in the unmodified clearcoats. As expected, the addition of the thixotrope resins dramatically improved the flow control, reducing the sag to as little as 12% of the control coating which contained only the microgel (FIG. 5). When the sag data was plotted against the molecular weight of the thixotropes (FIG. 6), the structural effects of the urethane thixotrope were significant.

Considering the strong correlation between the polyurethane structure of the thixotrope and molecular weight and sag resistance, it seemed unlikely that the "monomeric" diurea would be effective as a flow control agent in this system. As can be seen in Table VI, the improvement in sag in the high solids melamine-urethane enamels studied is too small to be of practical use at all and seriously degrades the appearance of the coatings. In addition, the synergistic effect observed with the acrylic microgel and the polymeric thixotropic resins are clearly absent with the monomeric species.

TABLE VI

| | EFFECT OF THE "MONOMERIC" N,N—DIETHANOLAMINE CAPPED DIUREA[a] ON COATING PROPERTIES OF CLEAR COATS | | | | | | | |
|---|---|---|---|---|---|---|---|---|
| Series | Diurea (Wt %) | Microgel (Wt %) | Viscosity[b] (Z-2 Sec) | Thickness (Microns) | Ave. (mm) | Sag (%) | Corrected Sag (mm) | (%) |
| 10 | 0 | 0 | 37 | 47 | 24 | 100 | 28 | 100 |
| 10 | 0 | 5 | 37 | 51 | 15 | 62 | 16 | 57 |
| 10 | 5 | 0 | 36 | 48 | 15 | 62 | 19 | 68 |
| 10 | 5 | 5 | 50 | 47 | 14 | 58 | 17 | 61 |

[a]Diurea is

[b]At 60 wt % solids, reduced with 4:2:1:1 2-pentanone:methanol:methyl cellosolve:butyl cellosolve.

Thus, the key to this invention is the combination of a diethanolurea-terminated polyurethane resin and a transparent filler that can act as a tie molecule. In this work, the filler molecule was a lightly cross-linked polymethyl methacrylate microgel. However, other polymeric microgels such as polystyrene, polyethylene, and polybutadiene which can serve as tie points for the thixotrope resins would serve as well.

Our data has fully demonstrated that the addition of small amounts of novel combinations of diethanolamine terminated urethane-urea resins and a transparent filler of acrylic microgel to the melamine-cured urethane clearcoats provided greatly reduced sagging. This reduction is achieved without compromising other desirable coating properties.

While our invention has been described in terms of a preferred embodiment thereof, it is to be appreciated that those skilled in the art will readily apply these teachings to other possible variations of the invention.

The embodiments of the invention in which an exclusive property or privilege is claimed are defined as follows:

1. A sprayable high solids urethane clearcoat composition comprising
    (1) a hydroxy-terminated urethane binder resin,
    (2) a suitable cross-linking agent, and
    (3) a flow control system consisting of a urethane-urea polymer and an organic filler of a polymer emulsion,
    said flow control system improving the sagging property of the urethane clearcoat when applied to vertically oriented substrates, said urethane-urea polymer contained in the flow control system being a reaction product of an isocyanate-terminated prepolymer and an ethanolamine selected from the group consisting of monoethanolamine, diethanolamine, and triethanolamine, said polymer thus being capable of forming polar and hydrogen bonds with molecules of said binder resin for improving said sagging property but not entering into the cross-linking reactions with said binder resin molecules when said binder resin is cured by the cross-linking constituent.

2. A sprayable polyurethane clearcoat composition which produces a durable, high gloss surface finish when applied to and cured over a suitable substrate, said composition comprising
   (1) a urethane binder resin which is the reaction product of an aliphatic polyisocyanate and a stoichiometric excess with respect to the polyisocyanate of polyether polyols,
   (2) an acid catalyzed melamine cross-linking agent, and
   (3) a sufficient amount of a flow control system consisting of a combination of urethane-urea polymer and a transparent filler of polymethyl methacrylate microgel,
   said flow control system reducing sagging of the urethane clearcoat when applied to vertically oriented substrates, said urethane-urea polymer being a reaction product of an isocyanate-terminated prepolymer prepared by the reaction of one or more polyols with an excess of a diisocyanate and an ethanolamine selected from the group consisting of monoethanolamine, diethanolamine, and triethanolamine, said polymer thus being capable of forming polar and hydrogen bonds with molecules of said binder resin for improving said sagging property but not entering into the cross-linking reactions with said binder resin molecules when said binder resin is cured by the crosslinking constituent.

3. A sprayable polyurethane clearcoat composition comprising at least about 50 weight percent nonvolatile constituents which composition produces a durable, surface finish when applied to and cured over a suitable substrate, said composition comprising
   (1) a urethane binder resin being a reaction product of an aliphatic polyisocyanate and a stoichiometric excess with respect to the polyisocyanate of polyether polyols,
   (2) an acid catalyzed melamine cross-linking agent, and
   (3) a flow control system consisting of a combination of urethane-urea polymer having number average molecular weight of between 500 and 5000 and a transparent filler of polymethyl methacrylate microgel having particle size between 1 and 50 microns in a ratio between 1:5 to 5:1,
   said flow control system when added in an amount of up to 20 wt% reducing sagging of the urethane clearcoat when applied to vertically oriented substrates without adversely affecting the viscosity and gloss properties, said urethane-urea polymer contained in the flow control system being a reaction product of an isocyanate-terminated prepolymer prepared by the reaction of one or more polyols with an excess of a diisocyanate and an ethanolamine selected from the group consisting of monoethanolamine, diethanolamine, and triethanolamine, said polymer thus being capable of forming polar and hydrogen bonds with molecules of said binder resin for improving said sagging property but not entering into the cross-linking reactions with said binder resin molecules when said binder resin is cured by the cross-linking constituent.

* * * * *